United States Patent
Yang et al.

(10) Patent No.: US 11,223,763 B2
(45) Date of Patent: Jan. 11, 2022

(54) MULTI-MODE IMAGE SENSOR APPLICABLE TO IMAGE SENSING AND ADDITIONAL DETECTION

(71) Applicant: Himax Imaging Limited, Tainan (TW)

(72) Inventors: Chih-Yen Yang, Tainan (TW); Yu-Yu Sung, Tainan (TW)

(73) Assignee: Himax Imaging Limited, Tainan (TW)

( * ) Notice: Subject to any disclaimer, the term of this patent is extended or adjusted under 35 U.S.C. 154(b) by 205 days.

(21) Appl. No.: 16/784,257

(22) Filed: Feb. 7, 2020

(65) Prior Publication Data
US 2021/0250503 A1    Aug. 12, 2021

(51) Int. Cl.
| | |
|---|---|
| H04N 5/232 | (2006.01) |
| H04N 9/04 | (2006.01) |
| G01S 7/481 | (2006.01) |
| G02B 5/20 | (2006.01) |
| G01J 1/42 | (2006.01) |

(52) U.S. Cl.
CPC ........ H04N 5/23245 (2013.01); G01J 1/4204 (2013.01); G01S 7/4816 (2013.01); G02B 5/201 (2013.01); G02B 5/208 (2013.01); H04N 9/0455 (2018.08)

(58) Field of Classification Search
CPC .............. H04N 5/23245; H04N 9/0455; G01S 7/4816; G01S 17/08; G02B 5/208; G02B 5/201; G01J 1/4204
See application file for complete search history.

(56) References Cited

U.S. PATENT DOCUMENTS

| | | | |
|---|---|---|---|
| 8,717,464 B2 | 5/2014 | Tang | |
| 8,743,176 B2* | 6/2014 | Stettner | H04N 5/2254 |
| | | | 348/43 |
| 9,257,461 B2 | 2/2016 | Cho | |
| 10,082,576 B2 | 9/2018 | Lee | |
| 11,138,428 B2* | 10/2021 | Skogo | G06K 9/00604 |

FOREIGN PATENT DOCUMENTS

| | | |
|---|---|---|
| TW | 201239387 A1 | 10/2012 |
| WO | 2009/046268 A1 | 4/2009 |

* cited by examiner

Primary Examiner — Seung C Sohn
(74) Attorney, Agent, or Firm — Winston Hsu

(57) ABSTRACT

A multi-mode image sensor applicable to image sensing and additional detection is provided. The multi-mode image sensor includes: a photodiode array, a hybrid type color filter array that is positioned on the photodiode array, and a mode controller. The photodiode array may include a plurality of photodiodes. The hybrid type color filter array may be arranged to perform optical filtering for the photodiode array. The mode controller may activate the photodiode array to output corresponding photo detection results in any of at least two modes. For example, in addition to an image sensing mode, the at least two modes may further include an ambient light sensor (ALS) mode and/or a proximity sensor (PS) mode.

12 Claims, 5 Drawing Sheets

MULTI-MODE IMAGE SENSOR APPLICABLE TO IMAGE SENSING AND ADDITIONAL DETECTION

BACKGROUND OF THE INVENTION

1. Field of the Invention

The present invention relates to sensors, and more particularly, to a multi-mode image sensor, wherein the multi-mode image sensor is applicable to image sensing and additional detection such as ambient light detection and proximity detection.

2. Description of the Prior Art

Image sensors such as that implemented by way of Complementary Metal-Oxide-Semiconductor (CMOS) sensor device, etc. have been widely used in electronic devices such as multifunctional mobile phones. According to the related art, a multifunctional mobile phone may need multiple holes on a certain portion of mechanical structure thereof for performing multiple types of optical sensing. More particularly, as one or more materials of the portion of mechanical structure may block the light, each type of the multiple types of optical sensing may need one or more corresponding holes, causing the design and implementation of the portion of mechanical structure to be complicated. In addition, the multiple types of optical sensing may cause high power consumption. Hence, there is a need for a novel architecture to enhance the overall performance of an electronic device without introducing a side effect or in a way that is less likely to introduce a side effect.

SUMMARY OF THE INVENTION

It is therefore an objective of the present invention to provide a multi-mode image sensor applicable to image sensing and additional detection such as ambient light detection and proximity detection, in order to solve the above-mentioned problems.

At least one embodiment of the present invention provides a multi-mode image sensor applicable to image sensing and additional detection. The multi-mode image sensor may comprise a photodiode array, a hybrid type color filter array that is positioned on the photodiode array, and a mode controller. The photodiode array may comprise a plurality of photodiodes. The hybrid type color filter array may be arranged to perform optical filtering for the photodiode array. In addition, the hybrid type color filter array may comprise a plurality of optical filters aligned to the plurality of photodiodes, respectively. More particularly, the plurality of optical filter may comprise a plurality of types of color filters respectively corresponding to multiple color channels, and a plurality of infrared (IR) band-pass filters corresponding to a predetermined IR band, where each type of the plurality of types of color filters may comprise at least one color filter corresponding to one of the multiple color channels. Additionally, the mode controller may activate the photodiode array to output photo detection results in any of at least two modes, wherein said at least two modes comprise an image sensing mode and an ambient light sensor (ALS) mode. For example, in the image sensing mode, the image sensor utilizes all of the plurality of photodiodes to output a set of primary photo detection results, for performing the image sensing; and in the ALS mode, the image sensor utilizes a portion of photodiodes corresponding to the ALS mode within the plurality of photodiodes to output a set of secondary photo detection results, for performing ambient light detection, wherein the additional detection comprises the ambient light detection.

At least one embodiment of the present invention provides a multi-mode image sensor applicable to image sensing and additional detection. The multi-mode image sensor may comprise a photodiode array, a hybrid type color filter array that is positioned on the photodiode array, and a mode controller. The photodiode array may comprise a plurality of photodiodes. The hybrid type color filter array may be arranged to perform optical filtering for the photodiode array. In addition, the hybrid type color filter array may comprise a plurality of optical filters aligned to the plurality of photodiodes, respectively. More particularly, the plurality of optical filter may comprise a plurality of types of color filters respectively corresponding to multiple color channels, and a plurality of IR band-pass filters corresponding to a predetermined IR band, where each type of the plurality of types of color filters may comprise at least one color filter corresponding to one of the multiple color channels. Additionally, the mode controller may activate the photodiode array to output photo detection results in any of at least two modes, wherein said at least two modes comprise an image sensing mode and a proximity sensor (PS) mode. For example, in the image sensing mode, the image sensor utilizes all of the plurality of photodiodes to output a set of primary photo detection results, for performing the image sensing; and in the PS mode, the image sensor utilizes a portion of photodiodes corresponding to the PS mode with the plurality of IR band-pass filters being aligned thereon within the plurality of photodiodes to output a set of secondary photo detection results, for performing proximity detection, wherein the additional detection comprises the proximity detection.

The present invention apparatus such as the image sensor applicable to image sensing and additional detection (e.g. ambient light detection and/or proximity detection) can minimize the number of holes for multiple types of optical sensing on mechanical structure of an electronic device such as a multifunctional mobile phone, and can save power and time in one or more of the multiple readout modes. In comparison with the related art, the present invention apparatus can enhance overall performance without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
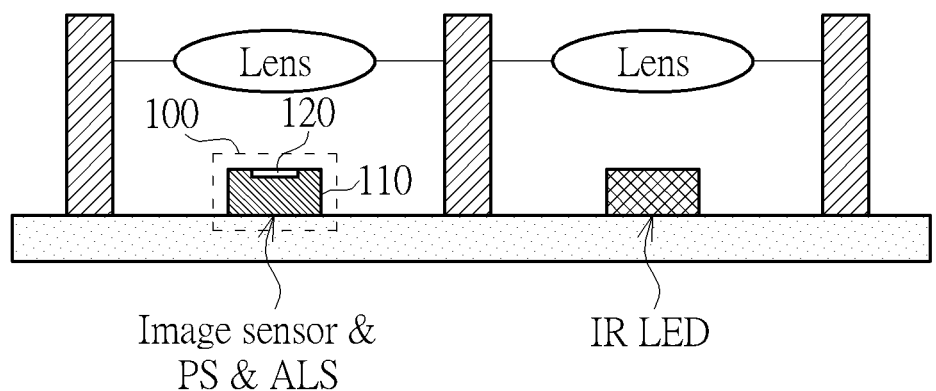
FIG. 1 is a diagram of an image sensor applicable to image sensing and additional detection according to an embodiment of the present invention, where an infrared (IR) light emitting diode (LED) and associated lens modules, holders, etc. are also illustrated for better comprehension.

FIG. 1 is a diagram of an image sensor 100 applicable to image sensing and additional detection according to an embodiment of the present invention, where an infrared (IR) light emitting diode (LED) and associated lens modules (labeled "Lens" for brevity), holders (e.g. the structure beside the lens modules as shown in FIG. 1), etc. are also illustrated for better comprehension. As the additional detection may comprise ambient light detection and proximity detection, the image sensor 100 may play the roles of a normal image sensor (e.g. a color image sensor), a proximity sensor (PS), and an ambient light sensor (ALS) in different modes, respectively (labeled "Image sensor & PS & ALS" for brevity). As shown in FIG. 1, the image sensor 100 may comprise a photodiode array 110 equipped with multiple readout modes, and a hybrid type color filter array 120 that is positioned on the photodiode array 110. The photodiode array 110 may be arranged to perform photo detection, and the hybrid type color filter array 120 may be arranged to perform optical filtering for the photodiode array 110. In addition, the IR LED may be utilized as an IR emission source for illumination when the image sensor 100 plays the role of the PS, but the present invention is not limited thereto. Based on the architecture shown in FIG. 1, the present invention apparatus such as the image sensor 100 can minimize the number of holes for multiple types of optical sensing on the mechanical structure of an electronic device (e.g. a multifunctional mobile phone, a tablet, etc.) comprising the image sensor 100, and can save power and time in one or more of the multiple readout modes.

Figure 2:
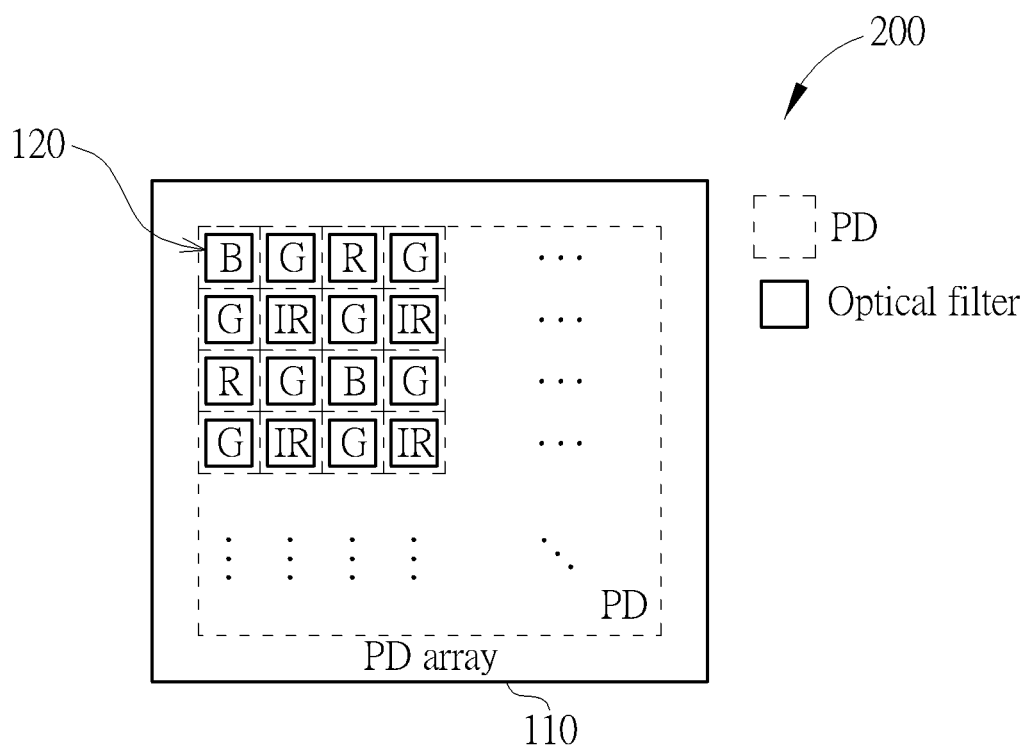
FIG. 2 illustrates a pixel array of the image sensor shown in FIG. 1 according to an embodiment of the present invention.

FIG. 2 illustrates a pixel array 200 of the image sensor 100 shown in FIG. 1 according to an embodiment of the present invention, where the pixel array 200 may comprise the photodiode array 110 (labeled "PD array" for brevity) and the hybrid type color filter array 120. The photodiode array 110 may comprise a plurality of photodiodes (labeled "PD" for brevity), and the hybrid type color filter array 120 may comprise a plurality of optical filters aligned to the plurality of photodiodes, respectively. More particularly, the plurality of optical filter may comprise a plurality of types of color filters respectively corresponding to multiple color channels, such as red (R), green (G) and blue (B) color filters respectively corresponding to R, G and B color channels (e.g. the R/G/B color filters are labeled "R", "G" and "B" to indicate their types, respectively), and a plurality of infrared (IR) band-pass filters (labeled "IR" for brevity) corresponding to a predetermined IR band, where each type of the plurality of types of color filters may comprise at least one color filter corresponding to one of the multiple color channels, such as one or more R/G/B color filters corresponding to the R/G/B color channel. For example, the predetermined IR band may represent an IR band around 850 nanometers (nm), but the present invention is not limited thereto.

The multiple readout modes may comprise an image sensing mode, an ALS mode, and a PS mode. For example, when the photodiode array 110 operates in the image sensing mode, the image sensor 100 may utilize (e.g. activate) all of the plurality of photodiodes to output a set of primary photo detection results, for performing image sensing; when the photodiode array 110 operates in the ALS mode, the image sensor 100 may utilize (e.g. activate) a portion of photodiodes corresponding to the ALS mode within the plurality of photodiodes to output a first set of secondary photo detection results, for performing the ambient light detection; and when the photodiode array 110 operates in the PS mode, the image sensor 100 may utilize (e.g. activate) a portion of photodiodes corresponding to the PS mode with the plurality of IR band-pass filters being aligned thereon within the plurality of photodiodes to output a second set of secondary photo detection results, for performing the proximity detection. In addition, the photodiode array 110 does not operate in any two of the multiple readout modes at the same time, and any two of the multiple readout modes are not activated at the same time.

In comparison with the image sensing mode, one or more additional modes differing from the image sensing mode, such as the ALS mode and the PS mode does not require all of the plurality of photodiodes to output photo detection results. When the photodiode array 110 operates in any of the one or more additional modes, the image sensor 110 may utilize a portion of photodiodes to output the corresponding secondary photo detection results, for performing the additional detection. For example, when the photodiode array 110 operates in the ALS mode, the portion of photodiodes corresponding to the ALS mode, rather than all of the plurality of photodiodes, may be arranged to output the first set of secondary photo detection results, whereby saving power and time. For another example, when the photodiode array 110 operates in the PS mode, the portion of photodiodes corresponding to the PS mode, rather than all of the plurality of photodiodes, may be arranged to output the second set of secondary photo detection results, whereby saving power and time. Therefore, the image sensor 100 can save power and time in these readout modes.

According to some embodiments, the arrangement of the hybrid type color filter array 120 may vary. For example, the number of optical filters in any type of optical filters within the plurality of types of color filters and/or the relative locations thereof in the hybrid type color filter array 120 may vary. For another example, the number of IR band-pass filters and/or the relative locations thereof in the hybrid type color filter array 120 may vary.

According to some embodiments, the image sensor 100 may select a set of photodiodes with at least one portion (e.g. a portion or all) of the plurality of types of color filters being aligned thereon within the plurality of photodiodes, such as a set of photodiodes differing from the portion of photodiodes corresponding to the PS mode, to be the portion of photodiodes corresponding to the ALS mode, but the present invention is not limited thereto. According to some embodiments, the image sensor 100 may select a set of photodiodes with at least one portion (e.g. a portion or all) of the plurality of IR band-pass filters being aligned thereon within the plurality of photodiodes, such as the portion of photodiodes corresponding to the PS mode, to be the portion of photodiodes corresponding to the ALS mode.

Figure 3:
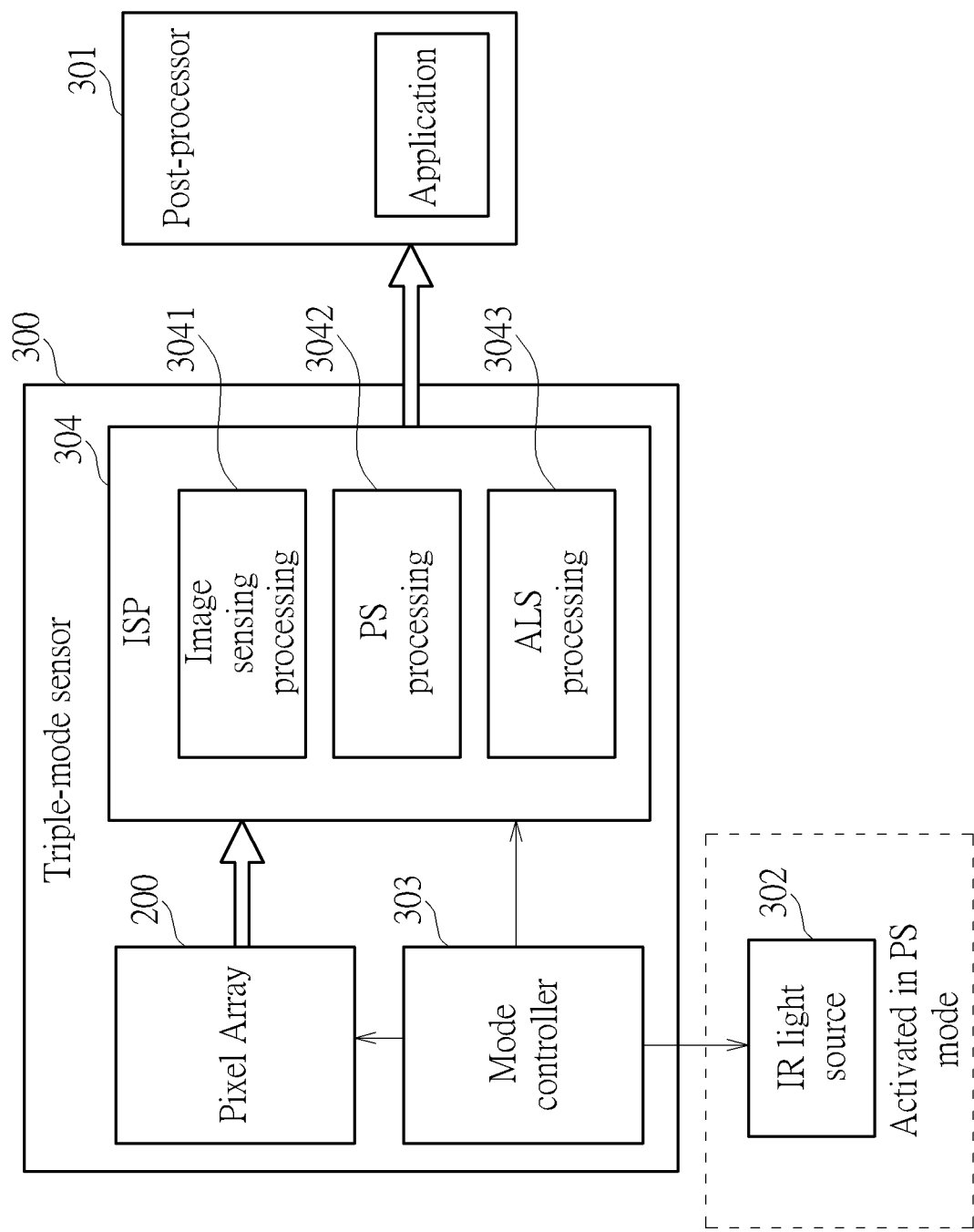
FIG. 3 illustrates a triple-mode sensor according to an embodiment of the present invention, where the image sensor shown in FIG. 1 may be implemented to be a multi-mode sensor such as the triple-mode sensor.
Figure 4:
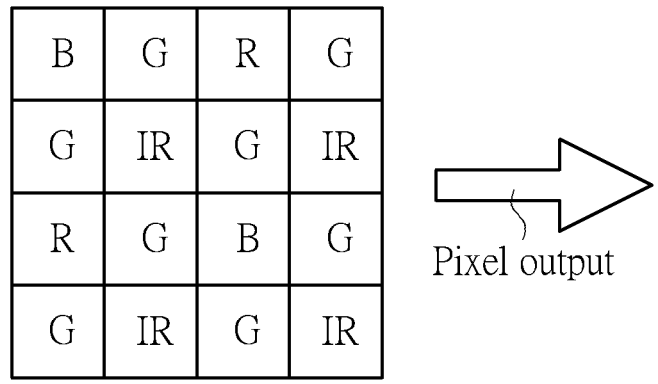
FIG. 4 illustrates an example of an image sensing mode of multiple readout modes of the image sensor shown in FIG. 1.
Figure 5:
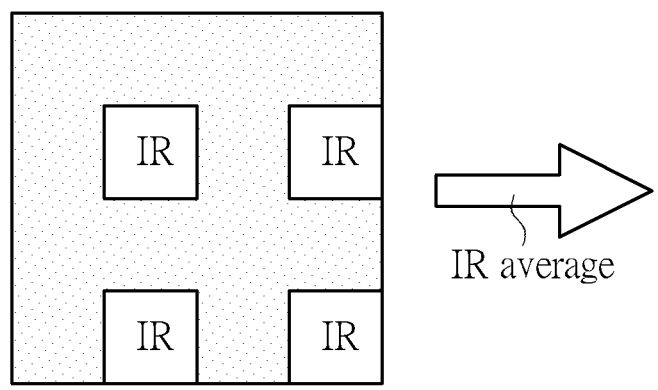
FIG. 5 illustrates an example of a proximity sensor (PS) mode of the multiple readout modes of the image sensor shown in FIG. 1.
Figure 6:
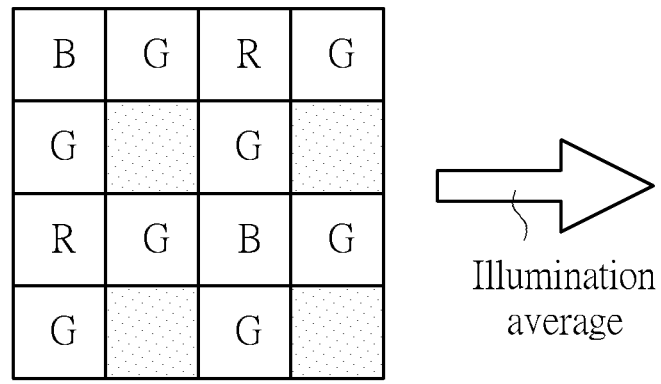
FIG. 6 illustrates an example of an ambient light sensor (ALS) mode of the multiple readout modes of the image sensor shown in FIG. 1.

FIG. 3 illustrates a triple-mode sensor 300 according to an embodiment of the present invention, and FIGS. 4-6 illustrate respective examples of the image sensing mode such as a color image mode (referred to as the color mode for brevity), the PS mode, and the ALS mode, where the image sensor 100 may be implemented to be a multi-mode sensor such as the triple-mode sensor 300, but the present invention is not limited thereto. The electronic device may comprise the multi-mode sensor such as the triple-mode sensor 300, and may further comprise a post-processor 301 running one or more application programs (labeled "Application" for brevity), and comprise an IR light source 302 (e.g. the IR illumination module comprising the IR LED and the lens module thereof as shown in FIG. 1). In addition, the triple-mode sensor 300 may comprise a mode controller 303 and an in-system programming (ISP) circuit 304 (labeled "ISP" for brevity) running ISP codes of image sensing processing 3041, the PS processing 3042 and the ALS processing 3043 respectively for the image sensing mode, the PS mode and the ALS mode. Additionally, the mode controller 303 may request the pixel array 200 and the ISP circuit 304 to operate in any mode of the image sensing mode (such as the color mode), the PS mode, and the ALS mode, and more particularly, may activate the pixel array 200 (e.g. the photodiode array 110 therein) to output corresponding photo detection results in the aforementioned any mode. For example, the mode controller 303 may activate the image sensing mode such as the color mode, and activate the associated ISP processing such as the image sensing processing 3041 in the image sensing mode. For another example, the mode controller 303 may activate the PS mode, and activate the associated ISP processing such as the PS processing 3042 together with the IR light source 302 in the PS mode. For yet another example, the mode controller 303 may activate the ALS mode, and activate the associated ISP processing such as the ALS processing 3043 in the ALS mode. It is noted that the mode controller 303 may be commanded by a host or the post-processor 301. In one embodiment, the mode controller 303 may be commanded to activate the PS mode or the ALS mode every predetermined time (e.g., 0.2 seconds (s)).

Regarding the image sensing mode, the ISP circuit 304 running the image sensing processing 3041 may perform dark level compensation and/or bad pixel compensation, and more particularly, may perform color de-mosaicking, but the present invention is not limited thereto. For example, the post-processor 301 running the one or more application programs may perform the color de-mosaicking. In one embodiment, the ISP circuit 304 may output a detection digital code indicating whether an object is within a predetermined distance in the PS mode and output an illumination average value ILLUMINATION$_{AVG}$ in the ALS mode by processing the second and the first sets of secondary photo detection results respectively, but the present invention is not limited thereto.

Regarding the PS mode, if an IR average value IR$_{AVG\_LED\_ON}$ is greater than a predetermined threshold TH$_{IR}$, the ISP circuit 304 running the PS processing 3042 may output a detection signal (e.g. a signal carrying digital code 1 such as a logical value 1) to indicate that there is an object nearby. For example, the detection signal may indicate that the object is within the predetermined distance (e.g. 5 cm) corresponding to the predetermined threshold TH$_{IR}$. In addition, the one or more application programs may comprise a backlight control program module for controlling a backlight of a touch-sensitive display panel (e.g. a touch screen) of the electronic device. The post-processor 301 running the backlight control program module may turn off the backlight according to the detection signal (e.g. the signal carrying digital code 1 such as the logical value 1). Regarding the ALS mode, the post-processor 301 running the backlight control program module may adjust the magnitude (e.g. brightness) of the backlight according to the illumination average value ILLUMINATION$_{AVG}$ generated through the ALS processing 3043. For example, when the ambient light becomes dimmer (e.g. the illumination average value ILLUMINATION$_{AVG}$ decreases), the post-processor 301 running the backlight control program module may decrease the magnitude (e.g. brightness) of the backlight; and when the ambient light becomes brighter (e.g. the illumination average value ILLUMINATION$_{AVG}$ increases), the post-processor 301 running the backlight control program module may increase the magnitude (e.g. brightness) of the backlight.

As shown in FIG. 4, in the image sensing mode such as the color mode, the image sensor 100 may utilize all of the plurality of photodiodes, such as the R, G and B photodiodes (respectively labeled "R", "G" and "B" for brevity) respectively having the R, G and B color filters thereon and the IR photodiodes (labeled "IR" for brevity) having the IR bandpass filters thereon, to generate the corresponding pixel outputs to be the set of primary photo detection results. For example, the R, G and B pixel outputs of a pixel may represent a summation of respective photo detection results of two R photodiodes minus two times an average of respective photo detection results of four IR photodiodes (which may be written as "(2R−2IR$_{AVG}$)" or "2(R−IR$_{AVG}$)" for brevity), a summation of respective photo detection results of eight G photodiodes minus eight times the average of the respective photo detection results of the four IR photodiodes (which may be written as "(8G−8IR$_{AVG}$)" or "8(G−IR$_{AVG}$)" for brevity), and a summation of respective photo detection results of two B photodiodes minus two times the average of the respective photo detection results of the four IR photodiodes (which may be written as "(2B−2IR$_{AVG}$)" or "2(B−IR$_{AVG}$)" for brevity), respectively, but the present invention is not limited thereto.

Figure 7:
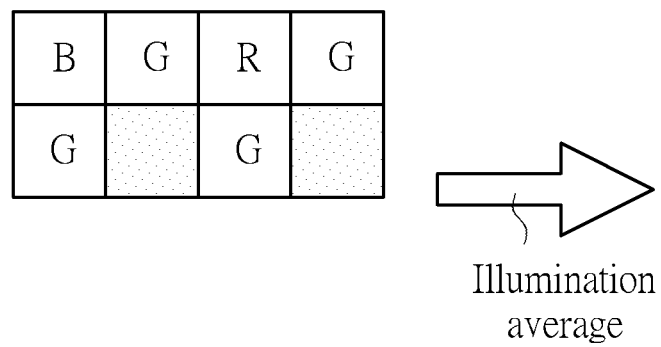
FIG. 7 illustrates another example of the ALS mode.
Figure 8:
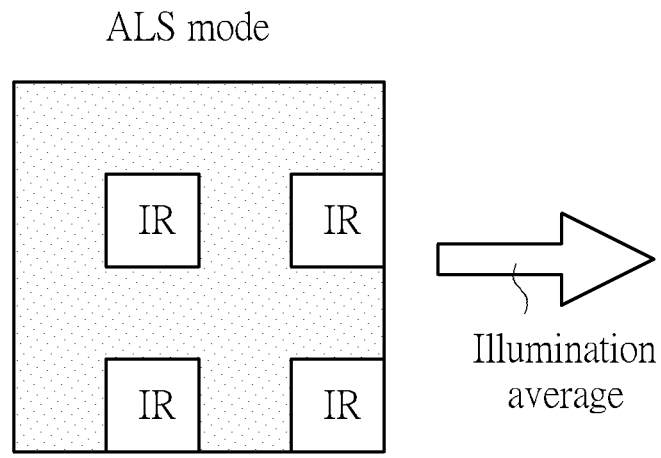
FIG. 8 illustrates yet another example of the ALS mode.

As shown in FIG. 5, in the PS mode, the image sensor 100 may utilize the portion of photodiodes corresponding to the PS mode, such as the IR photodiodes, to generate an IR average to be the second set of secondary photo detection results, where the IR LED may be turned on in the PS mode. For example, the IR average may represent an average of respective photo detection results of four IR photodiodes with the IR LED being turned on (which may be written as "IR$_{AVG\_LED\_ON}$=4IR/4" for brevity), but the present invention is not limited thereto. As shown in FIG. 6, in the ALS mode, the image sensor 100 may utilize the portion of photodiodes corresponding to the ALS mode, such as the R, G and B photodiodes, to generate an illumination average to be the first set of secondary photo detection results. For example, the illumination average may represent an average of respective photo detection results of two R photodiodes, eight G photodiodes, and two B photodiodes (which may be written as "ILLUMINATION$_{AVG}$=(2R+8G+2B)/12" for brevity), but the present invention is not limited thereto. For another example, as shown in FIG. 7, the illumination average may represent an average of respective photo detection results of one R photodiode, four G photodiodes, and one B photodiode (which may be written as "ILLUMINATION$_{AVG}$=(R+4G+B)/6" for brevity). For yet another example, as shown in FIG. 8, the image sensor 100 may utilize the portion of photodiodes corresponding to the PS mode, such as the IR photodiodes, to generate the illumination average to be the first set of secondary photo detection results, where the illumination average may represent an average of respective photo detection results of four IR photodiodes (which may be written as "ILLUMINATION$_{AVG}$=4IR/4" for brevity).

Figure 9:
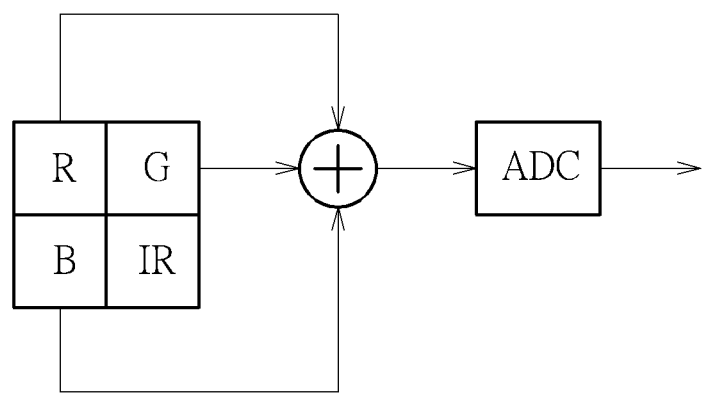
FIG. 9 illustrates a readout circuit of the image sensor shown in FIG. 1 according to an embodiment of the present invention, where an analog-to-digital converter (ADC) is also illustrated for better comprehension.

FIG. 9 illustrates a readout circuit of the image sensor 100 shown in FIG. 1 according to an embodiment of the present invention, where an analog-to-digital converter (ADC) is also illustrated for better comprehension. The readout circuit may be coupled to at least one portion (e.g. a portion or all) of one or more R photodiodes, one or more G photodiodes, one or more B photodiodes and one or more IR photodiodes (labeled "R", "G", "B", and "IR" for brevity) in any of the multiple readout modes, and more particularly, may read the pixel outputs, the IR average, and the illumination average in the image sensing mode (such as the color mode), the PS mode, and the ALS mode as mentioned above, respectively. Taking the ALS mode as an example, the readout circuit may read respective photo detection results of the one or more R photodiodes, the one or more G photodiodes, and the one or more B photodiodes to generate the average thereof to be the illumination average (e.g. "ILLUMINATION$_{AVG}$=(2R+8G+2B)/12" or "ILLUMINATION$_{AVG}$=(R+4G+B)/6"), but the present invention is not limited thereto. For another example, the readout circuit may read respective photo detection results of the one or more IR photodiodes (e.g. some IR photodiodes) to generate the average thereof to be the illumination average (e.g. "ILLUMINATION$_{AVG}$=4IR/4"). For yet another example, regarding the PS mode, the readout circuit may read respective photo detection results of the one or more IR photodiodes (e.g. some IR photodiodes) to generate the average thereof to be the IR average (e.g. "IR$_{AVG\_LED\_ON}$=4IR/4"). In some examples, regarding the image sensing mode such as the color mode, the readout circuit may read respective photo detection results of the one or more R photodiodes and the one or more IR photodiodes to generate a linear combination thereof (e.g. "(2R−2IR$_{AVG}$)") to be the R pixel output, read respective photo detection results of the one or more G photodiodes and the one or more IR photodiodes to generate a linear combination thereof (e.g. "(8G−8IR$_{AVG}$)") to be the G pixel output, and read respective photo detection results of the one or more B photodiodes and the one or more IR photodiodes to generate a linear combination thereof (e.g. "(2B−2IR$_{AVG}$)") to be the B pixel outputs. For brevity, similar descriptions for this embodiment are not repeated in detail here.

Please note that the method for reading from a photodiode is known in the CMOS Image Sensor (CIS) art, and therefore, some implementation details of the readout circuit may be omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-mode image sensor, applicable to image sensing and additional detection, the multi-mode image sensor comprising:
   a photodiode array, wherein the photodiode array comprises a plurality of photodiodes;
   a hybrid type color filter array, positioned on the photodiode array, arranged to perform optical filtering for the photodiode array, wherein the hybrid type color filter array comprises:
      a plurality of optical filters, aligned to the plurality of photodiodes, respectively, the plurality of optical filter comprising:
         a plurality of types of color filters respectively corresponding to multiple color channels, wherein each type of the plurality of types of color filters comprises at least one color filter corresponding to one of the multiple color channels; and
         a plurality of infrared (IR) band-pass filters corresponding to a predetermined IR band; and
   a mode controller, activating the photodiode array to output photo detection results in any of at least two modes, wherein said at least two modes comprise an image sensing mode and an ambient light sensor (ALS) mode;
wherein:
   in the image sensing mode, the image sensor utilizes all of the plurality of photodiodes to output a set of primary photo detection results, for performing the image sensing; and
   in the ALS mode, the image sensor utilizes a portion of photodiodes corresponding to the ALS mode within the plurality of photodiodes to output a set of secondary photo detection results, for performing ambient light detection, wherein the additional detection comprises the ambient light detection.

2. The multi-mode image sensor of claim 1, wherein in the ALS mode, the portion of photodiodes corresponding to the ALS mode, rather than all of the plurality of photodiodes, is arranged to output the set of secondary photo detection results, whereby saving power and time.

3. The multi-mode image sensor of claim 1, wherein the mode controller selects a set of photodiodes with at least one portion of the plurality of types of color filters being aligned thereon within the plurality of photodiodes to be the portion of photodiodes corresponding to the ALS mode.

4. The multi-mode image sensor of claim 1, wherein the mode controller selects a set of photodiodes with at least one portion of the plurality of IR band-pass filters being aligned thereon within the plurality of photodiodes to be the portion of photodiodes corresponding to the ALS mode.

5. The multi-mode image sensor of claim 1, wherein said at least two modes further comprise a proximity sensor (PS) mode; and the mode controller utilizes a portion of photodiodes corresponding to the PS mode with the plurality of IR band-pass filters being aligned thereon within the plurality of photodiodes to output another set of secondary photo detection results, for performing proximity detection, wherein the additional detection further comprises the proximity detection.

6. The multi-mode image sensor of claim 5, wherein the mode controller selects a set of photodiodes differing from the portion of photodiodes corresponding to the PS mode to be the portion of photodiodes corresponding to the ALS mode.

7. The multi-mode image sensor of claim 5, wherein the mode controller selects the portion of photodiodes corresponding to the PS mode to be the portion of photodiodes corresponding to the ALS mode.

8. The multi-mode image sensor of claim 5, further comprising:
   an in-system programming (ISP) circuit, arranged to output a detection digital code indicating whether an object is within a predetermined distance in the PS mode and output an illumination average value in the ALS mode by processing the sets of secondary photo detection results respectively.

9. The multi-mode image sensor of claim 1, further comprising:

an in-system programming (ISP) circuit, arranged to output an illumination average value in the ALS mode by processing the set of secondary photo detection results.

10. A multi-mode image sensor, applicable to image sensing and additional detection, the multi-mode image sensor comprising:
 a photodiode array, wherein the photodiode array comprises a plurality of photodiodes
 a hybrid type color filter array, positioned on the photodiode array, arranged to perform optical filtering for the photodiode array, wherein the hybrid type color filter array comprises:
  a plurality of optical filters, aligned to the plurality of photodiodes, respectively, the plurality of optical filter comprising:
   a plurality of types of color filters respectively corresponding to multiple color channels, wherein each type of the plurality of types of color filters comprises at least one color filter corresponding to one of the multiple color channels; and
   a plurality of infrared (IR) band-pass filters corresponding to a predetermined IR band; and
 a mode controller, activating the photodiode array to output photo detection results in any of at least two modes, wherein said at least two modes comprise an image sensing mode and a proximity sensor (PS) mode;
wherein:
 in the image sensing mode, the image sensor utilizes all of the plurality of photodiodes to output a set of primary photo detection results, for performing the image sensing; and
 in the PS mode, the image sensor utilizes a portion of photodiodes corresponding to the PS mode with the plurality of IR band-pass filters being aligned thereon within the plurality of photodiodes to output a set of secondary photo detection results, for performing proximity detection, wherein the additional detection comprises the proximity detection.

11. The multi-mode image sensor of claim 10, wherein in the PS mode, the portion of photodiodes corresponding to the PS mode, rather than all of the plurality of photodiodes, is arranged to output the set of secondary photo detection results, whereby saving power and time.

12. The multi-mode image sensor of claim 10, further comprising:
 an in-system programming (ISP) circuit, arranged to output a detection digital code indicating whether an object is within a predetermined distance in the PS mode by processing the set of secondary photo detection results.

* * * * *